United States Patent
Winokur

(10) Patent No.: US 10,769,028 B2
(45) Date of Patent: Sep. 8, 2020

(54) ZERO-TRANSACTION-LOSS RECOVERY FOR DATABASE SYSTEMS

(71) Applicant: AXXANA (ISRAEL) LTD., Tel Aviv (IL)

(72) Inventor: Alex Winokur, Ramat Gan (IL)

(73) Assignee: AXXANA (ISRAEL) LTD., Tel Aviv (IL)

( * ) Notice: Subject to any disclaimer, the term of this patent is extended or adjusted under 35 U.S.C. 154(b) by 1179 days.

(21) Appl. No.: 14/916,190

(22) PCT Filed: Oct. 14, 2014

(86) PCT No.: PCT/IB2014/065298
§ 371 (c)(1),
(2) Date: Mar. 3, 2016

(87) PCT Pub. No.: WO2015/056169
PCT Pub. Date: Apr. 23, 2015

(65) Prior Publication Data
US 2016/0224434 A1    Aug. 4, 2016

Related U.S. Application Data

(60) Provisional application No. 61/891,445, filed on Oct. 16, 2013.

(51) Int. Cl.
*G06F 11/14* (2006.01)
*G06F 11/16* (2006.01)
(Continued)

(52) U.S. Cl.
CPC .......... *G06F 11/1464* (2013.01); *G06F 11/14* (2013.01); *G06F 11/1474* (2013.01);
(Continued)

(58) Field of Classification Search
CPC ............. G06F 11/1464; G06F 16/1824; G06F 11/1662; G06F 11/2094; G06F 11/14;
(Continued)

(56) References Cited

U.S. PATENT DOCUMENTS 3,140,847 A    7/1964 Ames
5,027,104 A    6/1991 Reid
(Continued)

FOREIGN PATENT DOCUMENTS

EP    0420425 A2    4/1991
GB    2273180 A    6/1994
(Continued)

OTHER PUBLICATIONS

U.S. Appl. No. 15/169,811 office action dated Oct. 17, 2018.
(Continued)

*Primary Examiner* — Jorge A Casanova
(74) *Attorney, Agent, or Firm* — Kligler & Associates Patent Attorneys Ltd

(57) ABSTRACT

Methods, storage facilities and computer software products implement embodiments of the present invention that include partitioning a software stack (140) into a first software component (141), a second software component (142) and a third software component (143) managed respectively by a primary host (26) at a primary site (22), by a secure storage unit (30) at or adjacent to the primary site, the secure storage unit including a protection storage unit (92) and a disaster-proof storage unit (94), and by a recovery system (34) at a secondary site (24). One or more files (90) are stored in the disaster-proof unit using the first and the second software components, and following a disaster occurring at the primary site, the files are recovered using the secure storage unit and the recovery system.

31 Claims, 6 Drawing Sheets

(51) Int. Cl.
    *G06F 11/20*      (2006.01)
    *G06F 16/182*     (2019.01)
    *H04L 29/08*      (2006.01)

(52) U.S. Cl.
    CPC ...... *G06F 11/1662* (2013.01); *G06F 11/2094* (2013.01); *G06F 16/1824* (2019.01); *G06F 16/1827* (2019.01); *H04L 67/06* (2013.01); *H04L 67/1097* (2013.01); *G06F 11/1471* (2013.01); *G06F 11/2097* (2013.01); *G06F 2201/80* (2013.01); *G06F 2201/84* (2013.01)

(58) Field of Classification Search
    CPC ............. G06F 16/1827; G06F 11/1474; G06F 11/2097; G06F 2201/80; G06F 11/1471; G06F 2201/84; H04L 67/1097; H04L 67/06
    See application file for complete search history.

(56) References Cited

U.S. PATENT DOCUMENTS

| | | |
|---|---|---|
| 5,546,533 A | 8/1996 | Koyama |
| 5,594,900 A | 1/1997 | Cohn et al. |
| 5,623,597 A | 4/1997 | Kikinis |
| 5,680,579 A | 10/1997 | Young et al. |
| 5,724,501 A | 3/1998 | Dewey et al. |
| 5,799,141 A | 8/1998 | Galipeau et al. |
| 5,841,768 A | 11/1998 | Ozluturk et al. |
| 5,889,935 A | 3/1999 | Ofek et al. |
| 6,105,078 A | 8/2000 | Crockett et al. |
| 6,144,999 A | 11/2000 | Khalidi et al. |
| 6,158,833 A | 12/2000 | Engler |
| 6,173,377 B1 | 1/2001 | Yanai et al. |
| 6,226,651 B1 | 5/2001 | Masuda et al. |
| 6,260,125 B1 | 7/2001 | McDowell et al. |
| 6,298,290 B1 | 10/2001 | Abe et al. |
| 6,324,654 B1 | 11/2001 | Wahl et al. |
| 6,389,552 B1 | 5/2002 | Hamilton et al. |
| 6,400,730 B1 | 6/2002 | Latif et al. |
| 6,574,538 B2 | 6/2003 | Sasaki |
| 6,580,450 B1 | 6/2003 | Kersting et al. |
| 6,658,590 B1 | 12/2003 | Sicola et al. |
| 6,684,306 B1 | 1/2004 | Nagasawa et al. |
| 6,816,480 B1 | 11/2004 | Monroe et al. |
| 6,842,825 B2 | 1/2005 | Geiner et al. |
| 6,859,865 B2 | 2/2005 | De Margerie |
| 6,954,875 B2 | 10/2005 | Liu |
| 6,976,186 B1 | 12/2005 | Gardner |
| 7,020,743 B2 | 3/2006 | Lee et al. |
| 7,065,589 B2 | 6/2006 | Yamagami |
| 7,111,189 B1 | 9/2006 | Sicola et al. |
| 7,114,094 B2 | 9/2006 | Soejima |
| 7,120,834 B1 | 10/2006 | Bishara |
| 7,148,802 B2 | 12/2006 | Abbroscato et al. |
| 7,185,228 B2 | 2/2007 | Achiwa |
| 7,188,292 B2 | 3/2007 | Cordina et al. |
| 7,293,154 B1 | 11/2007 | Karr et al. |
| 7,302,506 B2 | 11/2007 | Harima et al. |
| 7,383,405 B2 | 6/2008 | Vega et al. |
| 7,386,376 B2 | 6/2008 | Basir et al. |
| 7,451,355 B1 | 11/2008 | Coatney et al. |
| 7,478,266 B2 | 1/2009 | Gatto et al. |
| 7,487,311 B2 | 2/2009 | Stroberger et al. |
| 7,523,149 B1* | 4/2009 | Sridharan ........... G06F 11/1456 |
| 7,548,560 B1 | 6/2009 | Dropps et al. |
| 7,577,724 B1 | 8/2009 | Jalagam et al. |
| 7,577,807 B2 | 8/2009 | Rowan et al. |
| 7,657,578 B1 | 2/2010 | Karr et al. |
| 7,668,177 B1 | 2/2010 | Trapp et al. |
| 7,707,453 B2 | 4/2010 | Winokur |
| 7,707,460 B2 | 4/2010 | Hyde, II et al. |
| 7,797,582 B1 | 9/2010 | Stager et al. |
| 7,984,327 B2 | 7/2011 | Winokur |
| 7,996,709 B2 | 8/2011 | Winokur |
| 8,015,436 B2 | 9/2011 | Winokur |
| 8,285,835 B1 | 10/2012 | Deolasee et al. |
| 8,289,694 B2 | 10/2012 | Winokur |
| 8,762,341 B1 | 6/2014 | Mahajan et al. |
| 8,914,666 B2 | 12/2014 | Winokur |
| 9,021,124 B2 | 4/2015 | Winokur |
| 9,195,397 B2 | 11/2015 | Winokur et al. |
| 2001/0044795 A1 | 11/2001 | Cohen et al. |
| 2001/0047412 A1 | 11/2001 | Weinman |
| 2002/0103816 A1 | 8/2002 | Ganesh et al. |
| 2002/0162112 A1 | 10/2002 | Javed |
| 2002/0176417 A1 | 11/2002 | Wu et al. |
| 2002/0188392 A1 | 12/2002 | Breed et al. |
| 2003/0014523 A1 | 1/2003 | Teloh et al. |
| 2003/0037034 A1 | 2/2003 | Daniels et al. |
| 2003/0093541 A1 | 5/2003 | Lolayekar et al. |
| 2003/0097607 A1 | 5/2003 | Bessire |
| 2003/0115324 A1 | 6/2003 | Blumenau et al. |
| 2003/0204597 A1 | 10/2003 | Arakawa et al. |
| 2004/0012316 A1 | 1/2004 | Davis |
| 2004/0030837 A1 | 2/2004 | Geiner et al. |
| 2004/0044649 A1 | 3/2004 | Yamato et al. |
| 2004/0044865 A1 | 3/2004 | Sicola et al. |
| 2004/0059844 A1 | 3/2004 | Jones et al. |
| 2004/0064639 A1 | 4/2004 | Sicola et al. |
| 2004/0073831 A1 | 4/2004 | Yanai et al. |
| 2004/0078637 A1 | 4/2004 | Fellin et al. |
| 2004/0083245 A1 | 4/2004 | Beeler |
| 2004/0153717 A1 | 8/2004 | Duncan |
| 2004/0193658 A1 | 9/2004 | Kawamura et al. |
| 2004/0193802 A1 | 9/2004 | Meiri et al. |
| 2004/0230352 A1 | 11/2004 | Monroe |
| 2004/0260873 A1 | 12/2004 | Watanabe |
| 2004/0267516 A1 | 12/2004 | Jibbe et al. |
| 2005/0005001 A1 | 1/2005 | Hara et al. |
| 2005/0015657 A1 | 1/2005 | Sugiura et al. |
| 2005/0027892 A1 | 2/2005 | McCabe et al. |
| 2005/0055357 A1 | 3/2005 | Campbell |
| 2005/0243609 A1 | 11/2005 | Yang et al. |
| 2005/0257015 A1 | 11/2005 | Hiraiwa et al. |
| 2005/0262170 A1 | 11/2005 | Girkar et al. |
| 2005/0273565 A1 | 12/2005 | Hirakawa et al. |
| 2005/0280421 A1 | 12/2005 | Yomoda et al. |
| 2006/0025897 A1 | 2/2006 | Shostak et al. |
| 2006/0031468 A1 | 2/2006 | Atluri et al. |
| 2006/0051157 A1 | 3/2006 | Bornstein et al. |
| 2006/0072580 A1 | 4/2006 | Dropps et al. |
| 2006/0075148 A1 | 4/2006 | Osaki |
| 2006/0274755 A1 | 12/2006 | Brewer et al. |
| 2006/0284214 A1 | 12/2006 | Chen |
| 2007/0061379 A1 | 3/2007 | Wong et al. |
| 2007/0079088 A1 | 4/2007 | Deguchi et al. |
| 2007/0083657 A1 | 4/2007 | Blumenau |
| 2007/0094467 A1 | 4/2007 | Yamasaki |
| 2007/0124789 A1 | 5/2007 | Sachson et al. |
| 2007/0180239 A1 | 8/2007 | Fujibayashi et al. |
| 2007/0198613 A1 | 8/2007 | Prahlad et al. |
| 2007/0226438 A1 | 9/2007 | Erofeev |
| 2007/0025175 A1 | 11/2007 | Liu et al. |
| 2007/0266197 A1 | 11/2007 | Neyama et al. |
| 2007/0271313 A1 | 11/2007 | Mizuno et al. |
| 2008/0001128 A1 | 1/2008 | Goldberg |
| 2008/0004904 A1 | 1/2008 | Tran |
| 2008/0061963 A1 | 3/2008 | Schnitz et al. |
| 2008/0104443 A1 | 5/2008 | Akutsu et al. |
| 2008/0177964 A1 | 7/2008 | Takahashi et al. |
| 2008/0184068 A1 | 7/2008 | Mogi et al. |
| 2008/0201390 A1 | 8/2008 | Anguelov |
| 2008/0263363 A1 | 10/2008 | Jueneman et al. |
| 2008/0297346 A1 | 12/2008 | Brackman et al. |
| 2009/0007192 A1 | 1/2009 | Singh |
| 2009/0216969 A1* | 8/2009 | Winokur ............. G06F 11/1441 |
| | | 711/162 |
| 2009/0313503 A1 | 12/2009 | Atluri et al. |
| 2010/0121824 A1 | 5/2010 | Kawamura et al. |
| 2011/0026527 A1 | 2/2011 | Shao et al. |
| 2011/0131186 A1 | 6/2011 | Whisenant |
| 2011/0276578 A1* | 11/2011 | Allalouf ................ G06F 3/0604 |
| | | 707/755 |

(56) References Cited

U.S. PATENT DOCUMENTS

| | | | |
|---|---|---|---|
| 2012/0124311 A1 | 5/2012 | Winokur | |
| 2013/0016721 A1 | 1/2013 | Bill et al. | |
| 2014/0201142 A1* | 7/2014 | Varadharajan | G06F 16/23 707/622 |
| 2014/0222971 A1 | 8/2014 | Cooper et al. | |
| 2015/0248308 A1 | 9/2015 | Little | |
| 2016/0147614 A1 | 5/2016 | Mittal et al. | |

FOREIGN PATENT DOCUMENTS

| | | |
|---|---|---|
| JP | H05-233413 A | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2008049703 A2 | 5/2008 |
| WO | 2014170810 A2 | 10/2014 |

OTHER PUBLICATIONS

IBM., "DFSMS Advanced Copy Services", IBM document SC35-0428-15, Sixteenth Edition, 731 pages, Feb. 2009.
U.S. Appl. No. 15/261,952 Office Action dated Jul. 28, 2017.
EMC® Symmetrix® Remote Data Facility (SRDF®),Product Guide,Revision 04, 178 pages, Mar. 2014.
Oracle Data Guard 11g, "Data Protection and Availability for Oracle Database"—An Oracle Technical White Paper, 22 pages ,Oct. 2011.
Veritas™ Volume Replicator Option by Symantec ,"A Guide to Understanding vol. Replicator"—A technical overview of replication capabilities included in Veritas Storage Foundation™ and the Volume Replicator Option, 28 pages, 2006.
Nadporojski, G., "Review of GSM-telephone Benefon Twin+", published on http://www.ixbt.com, 6 pages, Jan. 9, 2001.
Goldfire Ltd., "Technology and Solutions Developed for Our Clients", 4 pages, Brussels, Belgium, 2009.
Firetrust, "FireTrust Technology", 4 pages, Brussels, Belgium, 2009.
EMC Corporation, "EMC SRDF Family: High-Performance remote replication for business continuity", 2 pages, USA (Sep. 6, 2006).
IBM Corporation, "Storage Solutions: Data Encryption within the Drive Itself", 2 pages, USA (Sep. 6, 2006).
"Flexible Min-K: Product Information", 2 pages, Thermal Ceramics Inc, Jan. 2008.
ANSI/INCITS standard 269-1996, "Information Technology—SCSI-3 Fibre Channel Protocol (FCP)", American National Standards Institute (ANSI) and the International Committee for Information Technology Standards (INCITS), 77 pages, Apr. 8, 1996.
Dracle™—Database Backup and Recovery User's Guide, 11g Release 2 (11.2) , E10642-06, 604 pages, May 2015.
Winokur, A., U.S. Appl. No. 15/169,811, filed Jun. 1, 2016.
Oracle™—Concepts, 11g Release 2 (11.2) , E25789-01, 460 pages, Sep. 2011.
Litchfield., "Oracle Forensics Part 1: Dissecting the Redo Logs", An NGS Software Insight Security Research (NISR) Publication © 2007 Next Generation Security Software Ltd, pp. 1-17, Mar. 21, 2007.

* cited by examiner

ZERO-TRANSACTION-LOSS RECOVERY FOR DATABASE SYSTEMS

CROSS-REFERENCE TO RELATED APPLICATIONS

This application claims the benefit of U.S. Provisional Patent Application 61/891,445 filed on Oct. 16, 2013, which is incorporated herein by reference.

FIELD OF THE INVENTION

The present invention relates generally to storage systems, and specifically to implementing a partitioned file system in a computing facility that includes a disaster-proof storage unit.

BACKGROUND

A software stack comprises a set of software subsystems or components that can perform a task without further external dependencies. One example of a software stack is a file system. Computer systems use file systems to store and organize data on storage devices such as hard disks. File systems can be implemented as an index or a database containing a physical location of every piece of data on one or more storage devices. In Unix™ based computer systems, a file system is first "mounted" in order to enable software applications to access directories and files on one or more storage device managed by the file system.

In networked computing environments, file systems can be implemented in Storage Area Networks (SANs) and Network Attached Storage (NAS) systems. In both SAN and NAS systems, data is stored in "blocks" on a storage device managed by a storage controller (also known as a server), wherein a block is a sequence of bytes having a specific length (e.g., one megabyte). In a SAN configuration, a file system is mounted on a host computer in communication with the storage controller via the SAN, and the storage controller processes block-level storage commands (e.g., read data from a specific block, and write data to a specific block) received from the host computer.

In a NAS system, the file system is implemented in each NAS device, and the NAS devices process file-level storage commands (e.g., read data from a file) received from a host computer in communication with the NAS device via a local area network (LAN).

The description above is presented as a general overview of related art in this field and should not be construed as an admission that any of the information it contains constitutes prior art against the present patent application.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

There is provided, in accordance with an embodiment of the present invention a method, including partitioning a software stack into first, second and third software components managed respectively by a primary host at a primary site, by a secure storage unit at or adjacent to the primary site, the secure storage unit including a protection storage unit and a disaster-proof storage unit, and by a recovery system at a secondary site, storing one or more files in the disaster-proof unit using the first and the second software components, and following a disaster occurring at the primary site, recovering the files using the secure storage unit and the recovery system.

In some embodiments, the software stack can be selected from a first module configured to process block-level storage commands, and a second module configured to process file-level storage commands. In additional embodiments, the method may include partitioning data managed by the software stack into first, second and third data components stored respectively on a primary storage system at the primary site, the disaster-proof storage unit, and a secondary storage system at the secondary site, the second data component including the one or more files.

In further embodiments, partitioning the software stack may include the protection storage unit granting access to the second data component, and in supplemental embodiments, partitioning the software stack may include the disaster-proof storage unit granting access to the second data component. In some embodiments, the primary host includes a database server, and wherein the first data component includes a local database and one or more local logs, and wherein the second data component includes one or more secure logs, and wherein the third data component includes a remote database and one or more remote logs.

In additional embodiments, the method may include allocating a preselected amount of storage space in the disaster-proof storage unit for the one or more secure logs, and upon receiving a database transaction and detecting that the preselected amount of storage space is fully utilized, identifying a least recent database transaction in the one or more secure logs, deleting the identified database transaction from the one or more secure logs, and storing the received database transaction to the one or more secure logs.

In further embodiments, the method may include copying the local database to the remote database. In supplemental embodiments, copying the local database to the remote database can be selected from a list consisting of mirroring the local database, and creating the remote database from a backup of the local database.

In some embodiments, recovering the files stored in the disaster-proof storage unit using the secure storage unit and the recovery system may include accessing, by the recovery system, the one or more secure logs on the disaster-proof storage system, identifying, in the one or more secure logs, one or more database transactions not stored to the remote database, and updating the remote database with the one or more identified database transactions. In additional embodiments, the one or more secure logs can be stored in a raw volume on the disaster-proof storage system.

In further embodiments, accessing the one or more secure logs may include mapping, by a block manager executing on the recovery system, the recovery system to a raw device, and mapping, by a file system manager executing on the recovery system, the one or more secure logs to a logical volume created by the block manager mapping. In supplemental embodiments, accessing the one or more secure logs may include mapping, by a block manager executing on the disaster-proof storage system, a raw device to one or more logical volumes storing the one or more secure logs, thereby exposing the logical volume to the recovery system, and mapping, by a file manager executing on the recovery system, the one or more secure logs to the one or more logical volumes.

In some embodiments, accessing the one or more secure logs may include configuring the disaster-proof storage unit as a File Transfer Protocol (FTP) system selected from a list consisting of an FTP server and an FTP client, identifying, by the disaster-proof storage unit, the one or more secure logs, retrieving the one or more secure logs, and transmitting the retrieved one or more secure logs to the recovery system over an FTP protocol. In additional embodiments, accessing the one or more secure logs may include mapping, by an NAS manager executing on the disaster-proof storage system and a NAS client executing on the recovery system, the one or more secure logs to the recovery system.

There is also provided, in accordance with an embodiment of the present invention a storage facility, including a primary host located at a primary site and configured to manage a first software component of a software stack, a secure storage unit at or adjacent to the primary site, the secure storage unit including a protection storage unit and a disaster-proof storage unit, and configured to manage a second software component of the software stack, and to store one or more files in the disaster-proof unit, and a recovery system at a secondary site and configured to manage a third software component of the software stack, and following a disaster occurring at the primary site, to recover the files stored in the disaster-proof storage unit.

There is further provided, in accordance with an embodiment of the present invention a computer software product, the product including a non-transitory computer-readable medium, in which program instructions are stored, which instructions, when read by a computer, cause the computer to partition, in a storage facility, a software stack into first, second and third software components managed respectively by a primary host at a primary site, by a secure storage unit at or adjacent to the primary site, the secure storage unit including a protection storage unit and a disaster-proof storage unit, and by a recovery system at a secondary site, to store one or more files in the disaster-proof unit using the first and second software components, and following a disaster occurring at the primary site, to recover the one or more files using the secure storage unit the and recovery system.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
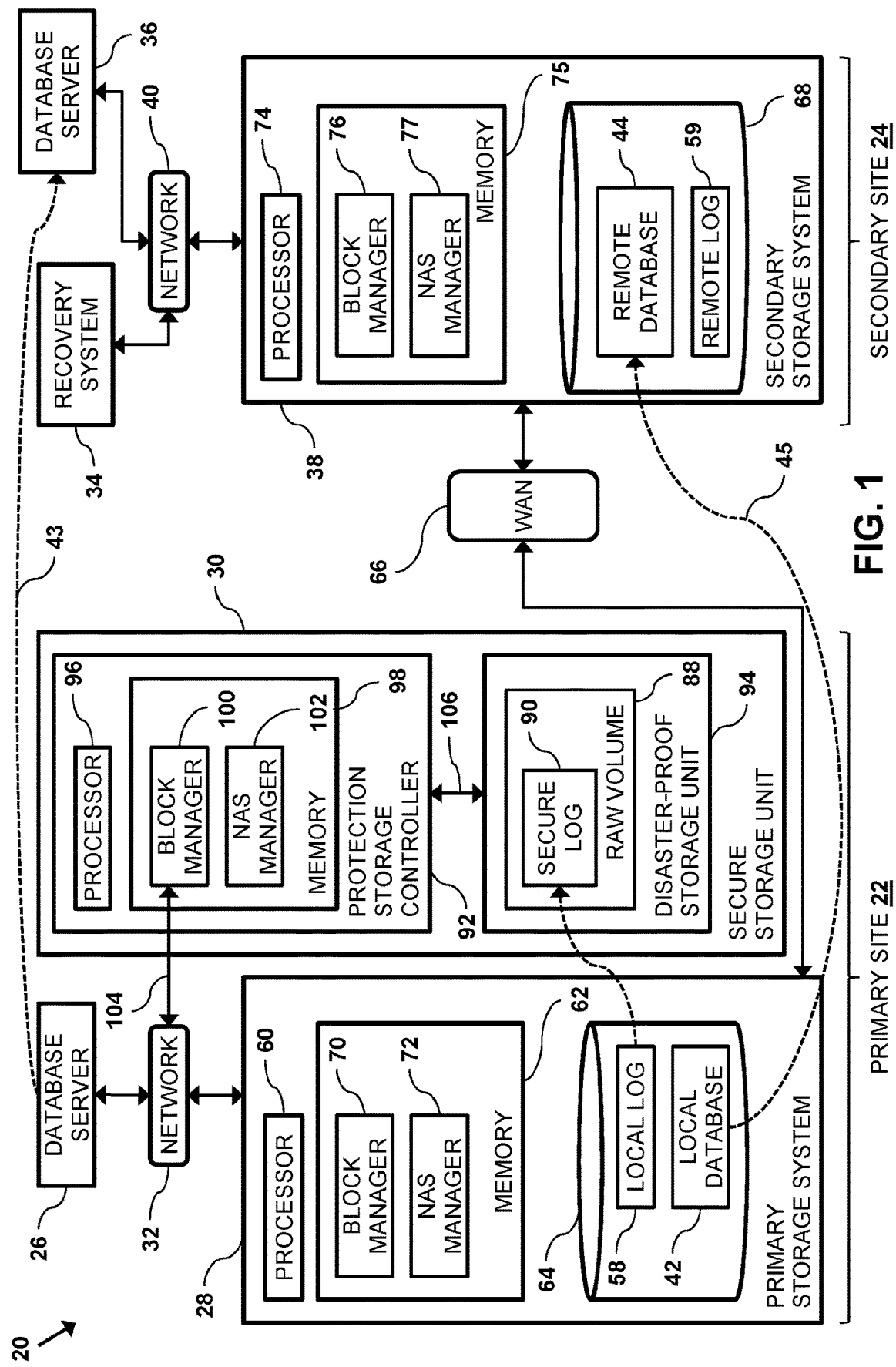
FIG. 1 is a block diagram that schematically illustrates a storage facility comprising a recovery file system managed by a database server at a primary site, a disaster-proof storage system at or adjacent to the primary site, and a recovery system at a secondary site, in accordance with an embodiment of the present invention.

Local storage facilities comprising a primary storage device that store mission critical data typically mirror the data to a secondary storage device at a secondary site. U.S. Pat. No. 7,707,453, to Winokur, whose disclosure is incorporated herein by reference, describes a disaster-proof storage unit that is co-located with the primary storage device, and used to assist in mirroring the data.

Embodiments of the present invention provide methods and systems for partitioning a software stack into first, second and third software components managed respectively by a primary host located at a primary site, by a secure storage unit at or adjacent to the primary site, and by a recovery system located at a secondary site. In embodiments described herein, the primary host may comprise a database server. As described hereinbelow, the secure storage unit comprises a protection storage controller and a disaster-proof storage unit.

The software stack may comprise a recovery file system (also referred to herein as a file system) configured to partition data (e.g., files) managed by the software stack into first, second and third data components stored respectively on a primary storage system located at the primary site, the disaster-proof storage unit, and a secondary storage system located at a secondary site. In a first embodiment, the software stack may comprise a Storage Area Network (SAN) software module configured to process block-level storage commands. In a second embodiment, the software stack may comprise a software module configured to process file-level storage commands. In the second embodiment, the primary storage system, the disaster-proof storage system and the secondary storage system can be configured as Network Attached Storage (NAS) systems.

In some embodiments, partitioning the software stack may comprise the protection storage controller granting access to the second data component. In alternative embodiments, partitioning the software stack may comprise the disaster-proof storage unit granting access to the second data component.

During normal operation, the data comprises one or more files that can be stored in the disaster-proof unit using the first and the second software components, and upon the disaster-proof detecting a disaster occurring at the primary site (e.g., a failure of the primary storage system, or a power failure at the primary site), the files stored in the disaster-proof storage unit can be recovered using the second and the third software components.

As described hereinbelow, a storage facility comprising the primary storage system can be configured to store data for a database server in communication with the storage facility. In embodiments of the present invention, the database server can store one or more local databases on the primary storage system, and one or more database log files to both the primary storage system and the disaster-proof storage unit. Each log file comprises an archive files or a "redo" file that stores transactions comprising updates to a given local database.

During regular operation, the database server (or the primary storage system) can mirror updates to the one or more local databases to one or more corresponding remote databases on the secondary storage system at the secondary site. Upon the disaster-proof storage unit detecting a failure in the primary site, any transactions that were not successfully mirrored to the secondary storage system can be conveyed from the disaster-proof storage unit to the secondary storage system, thereby enabling the secondary storage system to update a given remote database so that a state of the given remote database is identical to a state of the corresponding local database at the time of the failure.

System Description

Figure 2:
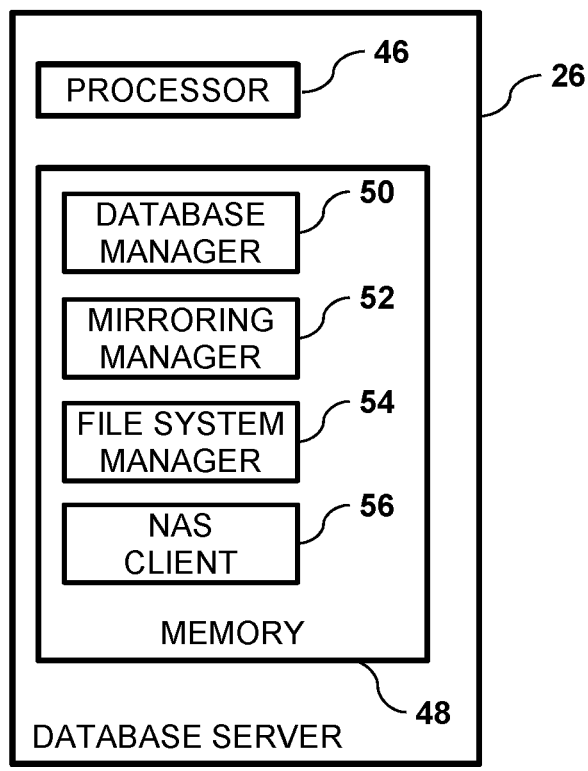
FIG. 2 is a block diagram of the database server, in accordance with an embodiment of the present invention.
Figure 3:
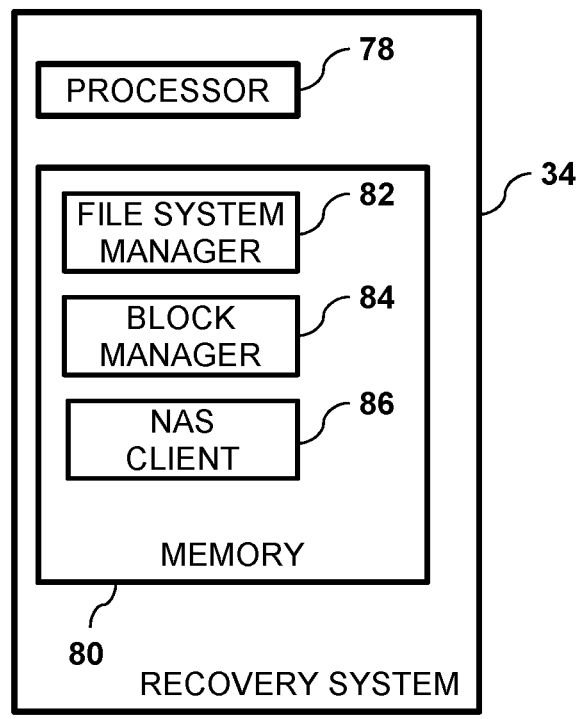
FIG. 3 is a block diagram of the recovery system, in accordance with an embodiment of the present invention.

FIG. 1 is a block diagram that schematically illustrates a storage facility 20 comprising a primary site 22 and a secondary site 24, FIG. 2 is a block diagram of a local database server 26 located at the primary site, and FIG. 3 is a block diagram of a recovery system 34 located at the secondary site, in accordance with an embodiment of the present invention. Primary site 22 comprises local database server 26, a primary storage system 28 and a secure storage unit 30 that communicate via a primary network 32. Secondary site 24 comprises recovery system 34, a remote database server 36 and a secondary storage system 38 that communicate via a secondary network 40.

Primary storage system 28 and secondary storage system 38 communicate via a wide area network (WAN) 66. In embodiments where devices in facility 20 are configured to process block-level storage commands, networks 32 and 40 may comprise storage area networks (SANs). In embodiments where devices in facility 20 are configured to process file-level storage commands, networks 32 and 40 may comprise local area networks (LANs). While the configuration in FIG. 1 shows sites 22 and 24 communicating via WAN 66, any other type of network connection between the primary and the secondary sites is considered to be within the spirit and scope of the present invention.

In embodiments of the present invention, database server 26 is configured to mirror a local database 42 from primary storage system 28 to a remote database 44 stored on secondary storage system 38. To mirror local database 42 to remote database 44, database server 26 can execute a mirroring application such as Data Guard™ produced by Oracle Corporation (Redwood City, Calif.). Oracle's Data Guard™ is configured to perform mirroring operations from database server 26 to database server 36, as indicated by an arrow 43.

In an alternative configuration, primary storage system 28 can be configured to mirror local database 42 to remote database 44. To mirror local database 42 to storage system 38, storage system 28 can execute a mirroring application such as Symmetrix Remote Data Facility™ (SRDF™) produced by EMC Corporation (Hopkinton, Mass.). EMC's SRDF™ is configured to perform mirroring operations from storage system 28 to storage system 38, as indicated by an arrow 45. While the configuration in FIG. 1 shows a single local database 42 mirrored to a single remote database 44, mirroring multiple local databases 42 to multiple remote databases 44 is considered to be within the spirit and scope of the present invention.

Database server 26 comprises a primary database processor 46 and a database memory 48 that stores a database management application 50, a mirroring manager 52, a file system manager 54 and a NAS client 56. In operation, database management application 50 initializes and updates local database 42 by conveying storage commands to primary storage system 28 via network 32. Database management application 50 also stores each local database update to a local log 58 stored on primary storage system 28.

Local log 58 comprises a file that stores multiple transactions that typically comprise a history of updates to local database 42, thereby guaranteeing atomicity, consistency, isolation and durability (also known as ACID properties) over crashes or hardware failures. Each update to local database 42 is stored as a separate transaction in local log 58. In embodiments where primary storage system 28 stores multiple local databases 42, primary storage system 28 can store a separate local log 58 for each of the local databases.

Mirroring manager 52 is configured to mirror updates in local database 42 to remote database 44, and to mirror updates in local log 58 to a remote log 59 on storage device 68. File system manager 54 is configured to map files and directories to logical volumes stored on primary storage system 28 and secure storage unit 30. NAS client 56 (as well as other NAS clients described herein) comprises a Network File System (NFS) client or a Common Internet File System (CIFS) client that is configured to communicate with an NFS/CIFS manager application executing on a NAS device in order to map, to database server 26, files stored on the NAS device.

Primary storage system 28 comprises a primary processor 60, a primary memory 62 and one or more primary storage devices 64. In some embodiments, primary storage system 28 communicates with secondary storage system 38 via wide area network (WAN) 66 in order to mirror local database 42 from primary storage device 64 to a secondary storage device 68 in secondary storage system 38. WAN 66 may comprise a wired or a wireless (e.g., cellular) communication infrastructures.

Primary storage processor executes, from memory 62, a block manager 70 and a NAS manager 72. Block manager 70 is configured to map a primary logical volume (not shown) that stores local database 42 and local log 58 to a storage device 64. In embodiments where storage system 28 is configured as a NAS device, NAS manager 72 communicates with NAS client 56 to map local data base 42 and local log 58 to database server 26.

In addition to secondary storage device 68, secondary storage system 38 comprises a secondary processor 74 and a secondary memory 75. Memory 75 stores a secondary block manager 76 and a secondary NAS manager 77. Block manager 76 is configured to map a secondary logical volume (not shown) that stores remote database 44 to secondary storage device 68. In embodiments where storage system 38 is configured as a NAS device, NAS manager 77 communicates with a NAS client executing in recovery system 34 to map remote data base 44 to the recovery system.

In some configurations, secondary storage system 38 may comprise multiple secondary storage devices 68. Storage devices 64 and 68 may comprise hard disks, computer memory devices (e.g., solid state drives (SSDs) and flash memory storage devices), and/or devices based on any other suitable storage technology. In some embodiments, storage devices 64 and 68 may have internal processors (not shown) that perform local data storage and retrieval-related functions.

Typically, as shown in FIG. 1, the primary and the secondary storage systems are physically located at two separate sites 22 and 24. The primary and the secondary sites are chosen to be sufficiently distant from one another, so that a disaster event in one of the sites will be unlikely to affect the other. In some embodiments, regulatory restrictions recommend a separation greater than 200 miles, although any other suitable distance can also be used. In the configuration shown in FIG. 1, the primary storage system is co-located with the database server at the primary site, and the secondary storage system is located at the secondary site.

Secondary site 24 comprises database server 36 and recovery system 34 in communication with secondary storage system via network 40. In an alternative embodiment, recovery system 34 can be directly connected to database server 36 via a high-speed interconnect such as Fibre Channel or 10-gigabit Ethernet (not shown). While the configurations of sites 22 and 24 comprise database servers 26 and 36, any log-based type of application servers in the facilities configured to process data stored on the primary and the secondary servers is considered to be within the spirit and scope of the present invention.

Recovery system 34 comprises a recovery processor 78 and a recovery memory 80 that stores file system manager 82, a block manager 84 and a NAS client 86. In operation, block manager 84 maps a raw volume 88 (also referred to herein as a raw device) to one or more logical volumes (or logical devices), and file system manager 82 maps the one or more logical volume to files such as a secure log 90. In configurations where mirroring manager 52 comprises Oracle's Data Guard™, local log 58 and secure log 90 are referred to as "Redo Logs" and "Archive Logs". Operation of secure log 90 is described in detail hereinbelow. In configurations where secure storage unit 30 is configured as a NAS device, NAS client 86 communicates with a secure NAS manager (described hereinbelow) in order to map secure log 90 to processor 78.

Processor 78 typically executes an operating system (not shown) such as Linux™ that is capable of running different file systems (also referred to herein as file system managers). In embodiments described herein running a given file system may also be referred to as mounting the given file system. In other words running/mounting a given file system comprises executing a given file system manager. Additionally, a given file system running on a given processor may also be referred to as the given file system residing on the given processor.

In some embodiments, recovery system 34 can use file-based (e.g., NAS) input/output (I/O) protocols such as file transfer protocol (FTP) when communicating with secure storage unit 30 over WAN 66. In alternative embodiments, recovery system 34 can communicate with secure storage unit 30 using block-level I/O protocols such as a Fibre Channel Protocol (FCP), a Small Computer System Interface (SCSI) protocol, and/or an Internet SCSI (iSCSI) protocol. To implement FCP, SCSI and iSCSI I/O protocols, various communication time-out parameters may need to be increased in order to handle the prolonged latency of an I/O requests and operations performed over long distances, especially if the I/O operations are performed over a wireless network.

In the event of a failure at primary site 22, embodiments of the present invention can update remote database 44 so that the remote database is synchronized to a state of local database 42 immediately prior to the failure. Upon synchronizing remote database 44 to the last state of local database 42, client computers (not shown) that were previously logged in to database server 26 can log into database server 36 in order to access the synchronized remote database.

In some embodiments, mirroring manager 52 may execute on processor 60 or an additional processor (not shown) in facility 22. In additional embodiments, the operation of secure storage unit 30 may be transparent to mirroring manager 52 and to database server 26. Thus, secure storage unit 30 can be installed as an add-on to existing mirroring applications. Mirroring manager 52 may comprise a software application such as Data Guard™ produced by Oracle Corporation (Redwood City, Calif.) or Veritas Volume Replicator™ produced by Symantec Corporation (Mountain View, Calif.).

Secure storage unit 30 comprises a protection storage controller 92 and a disaster-proof storage unit 94. Protection storage controller 92 comprises a protection processor 96 and a protection memory 98. Since protection storage controller 92 can be configured to operate at high communication rates (over 800 MB/sec), processor 96 is typically a high end processor.

Processor 96 executes, from memory 98, a block manager 100 and a NAS manager 102. Block manager 100 is configured to map a logical volume to raw volume 88. In configurations where protection storage controller 92 is configured as a NAS device, NAS manager 102 communicates with NAS client 56 in order to map secure log 90 to database server 26.

Protection storage controller 92 is coupled to network 32 via a front-end connection 104, and is coupled to disaster-proof storage unit 94 via a back-end connection 106. While the configuration shown in FIG. 1 has a single front-end connection 104 and a single back-end connection 106, configurations with multiple front-end connections 104 and multiple back-end connections 106 are considered to be within the spirit and scope of the present invention.

In some embodiments, protection storage controller 92 can implement multiple front end communication paths to one or more database servers 26, and implement multiple back-end communication paths to disaster-proof storage unit 94. When configured to process block-level storage commands, protection storage controller 92 can implement logic such as Logical Unit Number (LUN) masking, volume provisioning, and read/write operations to the secured storage through virtualized provisioned volumes.

In some configurations, processor 96 and the front-end and the back-end connections may generate heat such that the protection storage controller 92 cannot be protected from fire. In such cases, the protection storage controller may not be disaster-proof and may be assumed to be destroyed in case of a disaster such as a fire.

In configurations where protection storage controller 92 processes block-level storage commands, front-end connection 104 uses block-based storage protocols such as Infiniband™, FCP, SCSI and iSCSI to effect communication between protection storage controller 92 and primary storage system 28. Back-end connection 106 uses low-level storage protocols such as Serial Attached SCSI (SAS) and Serial Advanced Technology Attachment (SATA) protocols to effect communication between protection storage controller 92 and disaster-proof storage unit 94.

In order to reduce transaction latency, protection storage controller 92 is typically located within Fibre Channel Protocol (FCP) distance to primary storage system 28. Back-end connection 106 typically comprises a high-speed interconnect such as Fibre Channel or Serial Attached SCSI (SAS) connections.

Figure 4:
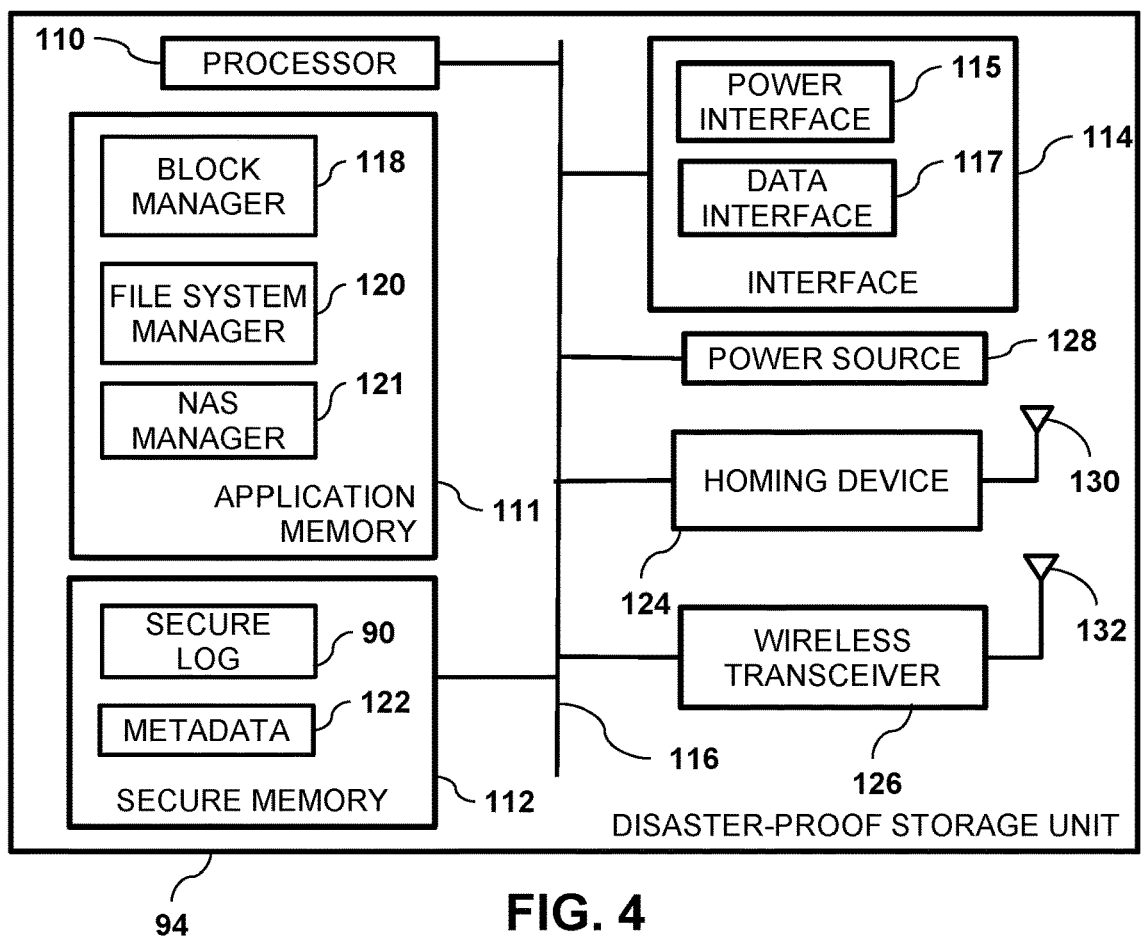
FIG. 4 is a block diagram of the disaster-proof storage unit, in accordance with an embodiment of the present invention.

FIG. 4 is a block diagram that schematically illustrates disaster-proof storage unit 94, in accordance with an embodiment of the present invention. Typically, disaster-proof storage unit 94 is constructed in a durable manner, so as to enable the disaster-proof storage unit to withstand disaster events while protecting secure log 90. An example of the mechanical construction of disaster-proof storage unit 94, as well as additional configurations of facility 20 is described in U.S. Pat. No. 7,707,453 referenced above.

Disaster-proof storage unit 94 comprises a secure processor 110, an application memory 111, a secure memory 112, and an interface 114 that are all coupled to a bus 116. In some embodiments unit 94 may comprise multiple interfaces 114 and multiple buses 116 in order to support high throughput demands of one or more database servers 26. During normal operation, disaster-proof storage unit 94 can function as a storage device (e.g., a disk drive) where storage space can be allocated to construct volumes as part of the volume provisioning procedure running in protection storage controller 92. Disaster-proof storage unit 94 is typically positioned in close proximity to the primary storage system so as to reduce I/O latency.

Memory 112 typically comprises an ultrafast storage device. In some embodiments, memory 112 may comprise a non-volatile memory device such as a solid-state drive (SSD) or a flash device. Alternatively, memory 112 may comprise any other suitable non-volatile or battery-backed memory device. In further embodiments, memory 112 may comprise one or more memory devices.

Memory 111 stores a secure block manager 118, a secure file system manager 120 and a secure NAS manager 121. Memory 112 stores secure log 90 and metadata 122. Upon updating local database 42, database server 26 stores database transactions to both local log 58 via primary storage system 28 and to secure log 90 via protection storage controller 92. In some low-throughput environments, database server 26 may directly update secure log 90 in disaster-proof storage unit 94 (i.e., bypassing protection storage controller 92). In operation, disaster-proof storage unit 94 can function as a storage device coupled to protection storage controller 92, and processor 96 stores the database transactions to secure log 90 in memory 112.

In the event of a disaster at primary site 22, primary storage system 28 and protection storage controller 92 may be destroyed. Therefore, in embodiments of the present invention, disaster-proof storage unit 94 can operate as a standalone storage controller/server. Block manager 118 implements logic that maps raw volume 88 to one or more logical volumes (or logical devices), and file system manager 120 maps the one or more logical volume to files such as one or more secure logs 90. In configurations where disaster-proof storage unit is configured as a NAS device, NAS manager 121 communicates with NAS client 56 in order to map one or more secure logs 90 to the recovery system.

In some embodiments, processor 110 can mount the same file system as the file system mounted by database server 26, thereby configuring disaster-proof storage unit 94 with "standalone" file system functionality when providing access to secure log 90 via block manager 118 and file system manager 120. Since processor 110 may need to mount different file systems (i.e., depending on the file system mounted on database server) the secure processor can be configured to run a Linux™ operating system distribution capable of mounting many different file systems.

Memory 112 stores metadata 122 that defines files such as secure log 90, and can store file system information such as directory (i.e., inode) data and free space lists that can be used by processors 96 and 110. In embodiments where disaster-proof storage unit 94 is configured as a SAN storage device, recovery system 34 can retrieve metadata 122 from memory 112, and use the retrieved metadata in order to access secure log 90 (or any files in memory 112) during a recovery operation. Likewise, in embodiments where disaster-proof storage unit 94 is configured as a NAS storage device, secure processor 110 can use metadata 122 in order to provide access to secure log 90 during a recovery operation.

Interface 114 comprises a power interface 115 to power the various elements of disaster-proof storage unit 94, and a data interface 117 such as Fibre Channel that is coupled to back-end connection 106. Data interface 117 can use low-level storage protocols such as Serial Attached SCSI (SAS) and Serial Advanced Technology Attachment (SATA) protocols to communicate with back-end connection 106.

In the configuration shown in FIG. 4, disaster-proof storage unit 94 also comprises a homing device 124, a wireless transceiver 126 and a power source 128, all coupled to bus 116. Homing device 124 is coupled to a homing antenna 130, and comprises a transmitter or transponder, which transmits a radio frequency (RF) homing signal in order to enable disaster-proof storage unit 94 to be located and retrieved following a disaster event. Typically, homing device 124 begins to operate when disaster-proof storage unit 94 detects that a disaster event occurred. Device 124 may comprise an active, passive or semi-active homing device.

In some embodiments, homing device 124 is powered by power source 128. Power source 128 may comprise a rechargeable battery, which is charged by electrical power provided via power interface 115 during normal system operation. Alternatively, power source 128 may comprise any other suitable battery. In some embodiments, power source 128 is used to power processor 110 and/or memory 112 when disaster-proof storage unit 94 does not receive power from power interface 115.

Wireless transceiver 126 is coupled to a communication antenna 132. Transceiver 126 is typically powered by power source 128. In some embodiments, transceiver 126 is used for transmitting the transactions stored in secure log 90 to a wireless receiver (not shown), when the communication between disaster-proof storage unit 94 and protection storage controller 92 is broken due to a disaster event. As such, transceiver 126 and antenna 132 serve as alternative communication means for transmitting information from disaster-proof storage unit 94.

Using the wireless transceiver, database transactions stored in the secure log can be retrieved and used to synchronize remote database 44 to the last known state of local database 42, as described hereinbelow. Other retrieval methods may involve physical operations such as locating and retrieving data from the disaster-proof storage unit, and detaching memory 112 from disaster-proof storage unit 94, may sometimes take several hours or even days.

Transceiver 126 may comprise, for example, a cellular transceiver, a WiFi transceiver, a WiMax transceiver, or any other suitable data transceiver type. When performing database recovery operations, transceiver 126 can communicate with an additional wireless transceiver (not shown) coupled to secondary storage system 38 and/or recovery system 34. While the configuration in FIG. 1 shows recovery system 34 separate from secondary storage system 38, configuring the secondary storage system to perform the application logic performed by the recovery system (as described herein) is considered to be within the spirit and scope of the present invention.

In some embodiments, the functions of homing device 124, transceiver 126, and antennas 130 and 132 can be performed by a single transceiver and a single antenna. For example, several methods are known in the art for determining a position of a cellular transmitter. Such methods can be used to locate wireless transceiver 126 when it transmits data from disaster-proof storage unit 94, thus eliminating the need for a separate homing device.

Processors 46, 60, 74, 78 96, and 110 typically comprise general-purpose central processing units (CPU), which are programmed in software to carry out the functions described herein. The software may be downloaded to database server 26, primary storage system 28, secondary storage system 38, protection storage controller 92, disaster-proof storage unit 94 and recovery system 34 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Recovery File System Management

As described hereinabove, database servers 26 and 36, disaster-proof storage unit 94 and recovery system 34 can each run (i.e., mount) a file system in order to access local database 42, local log 58, secure log 90 and remote database 44. In embodiments of the present invention, processors 46, 96, 78 and 110 can define a software stack that can be partitioned into first, second and third software components. In embodiments of the present invention, the software stack comprises a recovery file system, as described in the description referencing FIG. 6 hereinbelow.

Figure 5:
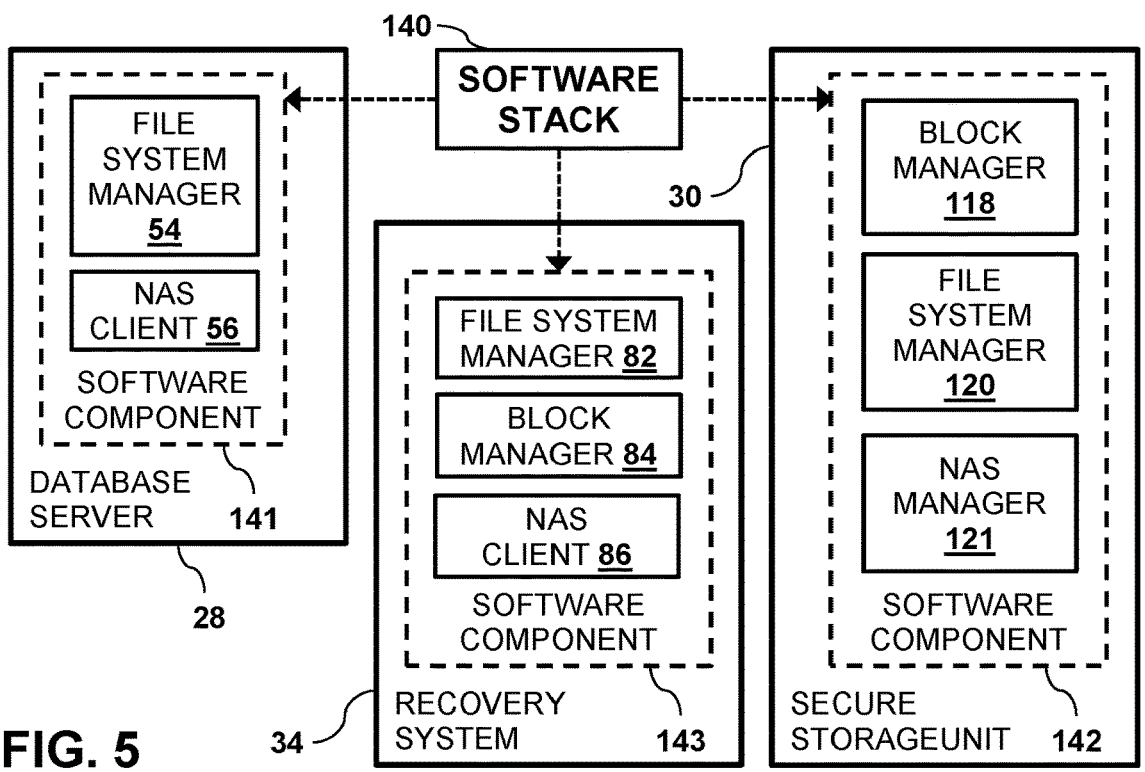
FIG. 5 is a block diagram of a software stack configured to manage the recovery file system, in accordance with an embodiment of the present invention.

FIG. 5 is a block diagram of a software stack 140 partitioned into a first software component 141, a second software component 142, and a third software component 143 that are managed respectively by database server 28, secure storage unit 30 and recovery system 34, in accordance with an embodiment of the present invention. In the configuration shown in FIG. 5, software component 141 comprises file system manager 54 and NAS client 56, software component 142 comprises block manager 118, file system manager 120 and NAS manager 121, and software component 143 comprises file system manager 82, block manager 84 and NAS client 86.

Figure 6:
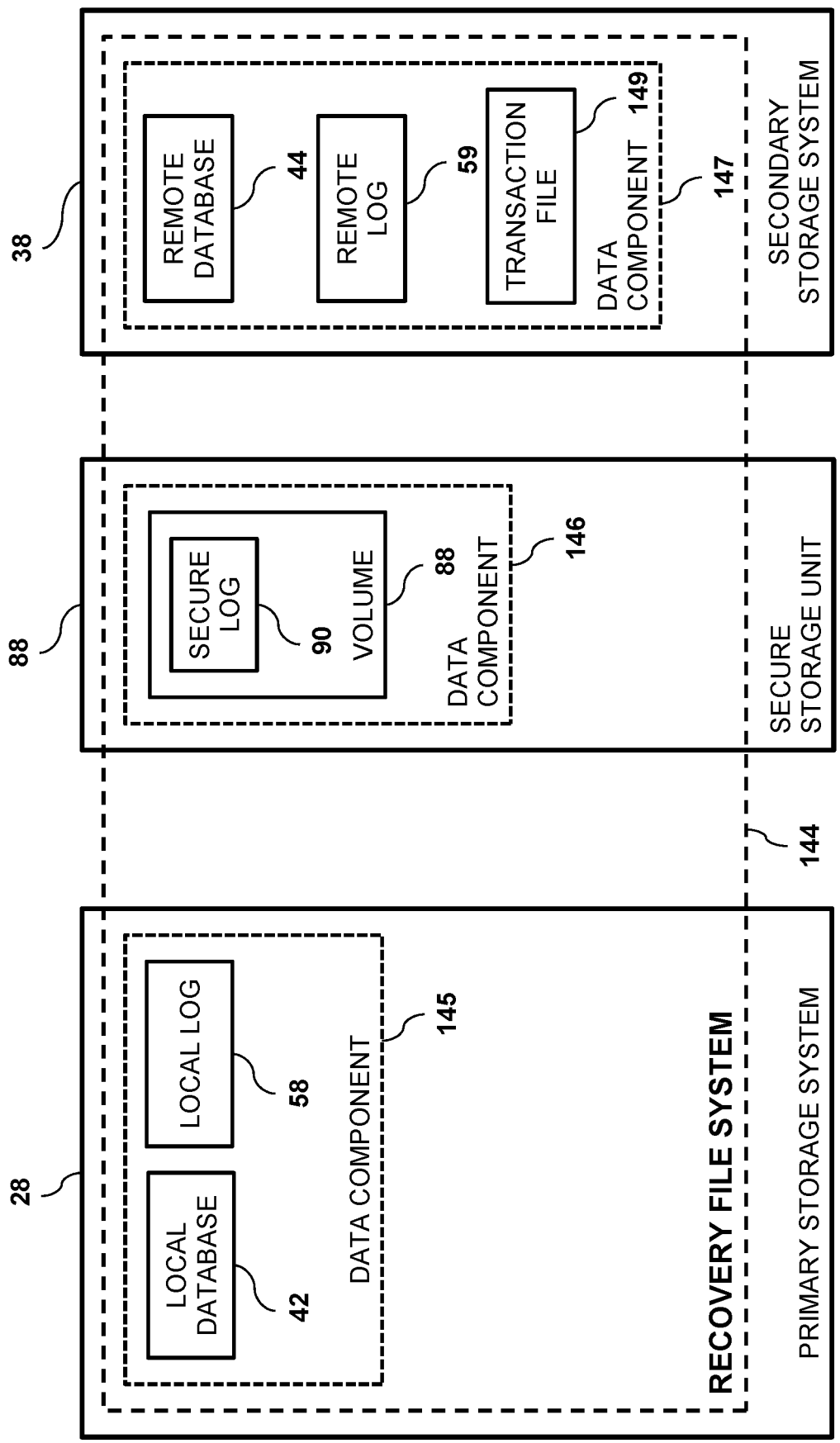
FIG. 6 is a block diagram of the recovery file system, in accordance with an embodiment of the present invention.

FIG. 6 is a block diagram of a recovery file system 144, in accordance with an embodiment of the present invention. In embodiments of the present invention as described supra, software stack 140 may comprise a file system such as recovery files system 144. Recovery file system 144 comprises a first data component 145, a second data component 146, and a third data component 147 that are stored respectively on primary storage system 28, secure storage unit 88, and secondary storage system 38. First data component 145 comprises local database 42 and local log 58, second data component 146 comprises secure log 90 on volume 88, and third data component 147 comprises remote database 44, remote log 59 and a transaction file 149.

As explained herein, recovery system 34 receives secure log 90 from disaster-proof storage unit 94, and identifies and stores transactions in the secure log that are missing from remote log 59 to a location on storage device 68 known to database server 36. To identify the missing transactions, processor 78 can compare system change numbers (SCNs) in the most recent transactions in both the local and the remote logs. Upon storing the missing transactions to remote log 59, database server 36 can then retrieve the missing transactions from the location on storage device 68, and use the retrieved transactions to synchronize remote database 44 to the last known state of local database 42, as is known in the art and described in "Oracle™ Database Backup and Recovery User's Guide 11g Release 2 (11.2) E10642-06".

In embodiments of the present invention:
Database server 26 is configured to manage first data component 145. As described supra, the first data component comprises local database 42 and local log 58.
Secure storage unit 30 (i.e., protection storage controller 92 and/or disaster-proof storage unit 94) is configured to manage second data component 146. As described supra, the second data component comprises secure log 90.
Recovery system 34 and database server 36 are configured to manage third data component 147. As described supra, the third data component comprises remote database 44, remote log 59, and transaction file 149 that are all on secondary storage system 38. When updating remote database 44 to the last known state of local database 42, recovery system 34 can store the missing transactions to transaction file 149, as described hereinbelow.

Figure 7:
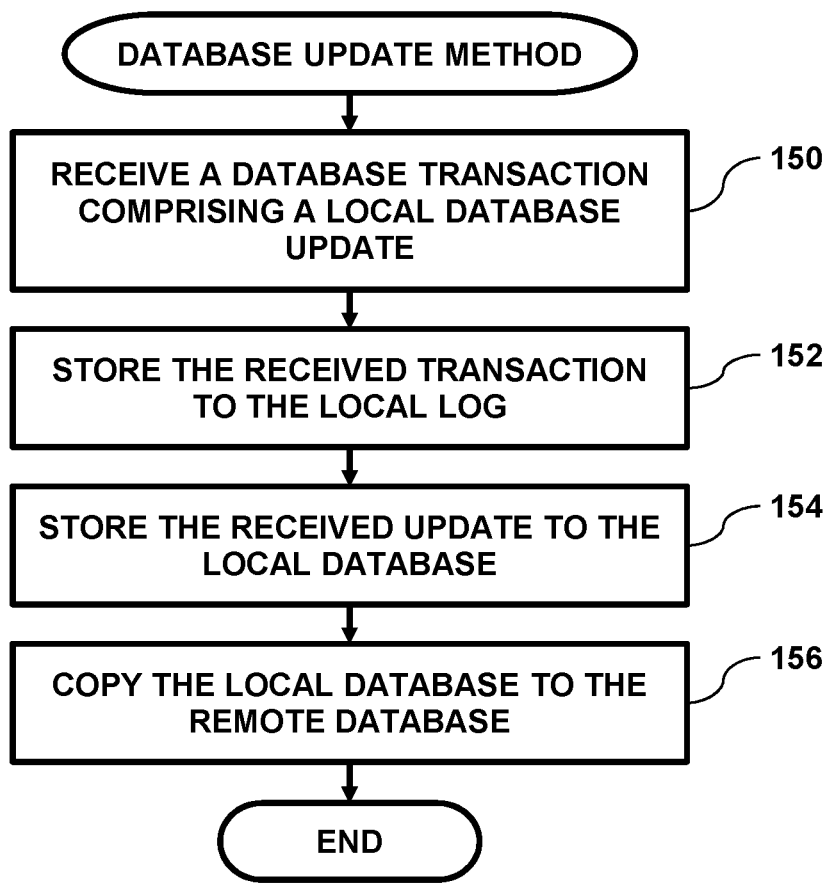
FIG. 7 is a flow diagram that schematically illustrates a method of updating a local database, in accordance with an embodiment of the present invention.

FIG. 7 is a flow diagram that schematically illustrates a method of updating local database 42, in accordance with an embodiment of the present invention. The steps described in the flow diagram are typically performed during "regular" operation of sites 22 and 24 (i.e., when all components are working correctly, as well as when processor 110 detects protection storage controller 92 and/or primary storage system 28 are functioning properly, and there is no disaster at primary site 22).

In a receive step 150, processor 60 receives, from database server 26 database transaction comprising an update to local database 42. Examples of database transactions include, but are not limited to, adding one or more records to local database 42, modifying one or more records in the local database, and inserting or deleting one or more records from the local database.

In a second store step 152, processor 46 stores the received transaction to local log 58 and secure log 90 using embodiments described hereinabove, and in a first store step 154, the primary database processor stores the received update to local database 42. Finally, in a copying step 156, database server 26 copies local database 42 to remote database 44, and the method ends.

In some embodiments, copying the local database comprises mirroring manager 52 mirroring local database 42 to remote database 44 by asynchronously mirroring the received update to the remote database. In alternative embodiments, copying the database comprises processor 46 (or processor 60) creating a backup of local database 42, and processor 74 creating the remote database 44 by restoring the backup to the remote database.

In operation, a preselected amount of storage space can be allocated within disaster-proof storage unit 94 to protect each local database 42. The preselected amount of storage space can be allocated as one or more logical volumes in a SAN configuration, or as one or more file systems in a NAS configuration. Within the allocated storage space, files can be allocated to hold one or more secure logs 90.

The preselected amount of storage space is typically allocated to hold a number of transactions that have not yet been synchronized with remote database 44. A preselected amount of allocated space can be estimated to be space necessary to store the maximum number of transactions that have not yet been synchronized with remote database 44. In operation, upon receiving a database transaction and detecting that the preselected amount of storage space is fully utilized, disaster-proof storage unit 94 can identify a least recent database transaction in secure log 90, delete the identified database transaction from secure log, and store the received database transaction to the secure log.

Site 22 (or site 24) allocates secure log(s) 90 in the allocated storage space. File names of the secure logs can indicate their associated database and local log 90. In embodiments where database server 26 stores transactions for local database 42 to multiple local logs 58 and multiple secure logs 90, upon detecting that the allocated space in secure memory 112 is fully utilized, mirroring manager 52 can cycle between the multiple secure logs 90 in order to overwrite the oldest transaction data in each of the secure logs.

In configurations where a total possible data gap (i.e., non-synchronized transactions) between local database(s) 42 and remote database(s) 44 is greater than the size of the secure log(s) 90, a specific number of archive log files (not shown) can be stored in secure memory 112. The archive log files are typically deleted by the mirroring manager 52 or database manager 50 based on a user-specified deletion policy (e.g., delete the oldest archive log file when the allocated storage space is fully utilized, or when all corresponding transactions have been mirrored to remote log 59).

Failure Recovery

In the event of a disaster (or a component failure) at primary site 22, remote database 44 may not be completely synchronized to local database 42. Embodiments of the present invention provide methods and systems for recovery system 34 to synchronize, using one or more transactions stored in secure log(s) 90, remote database 44 to the last known state of local database 42.

Figure 8:
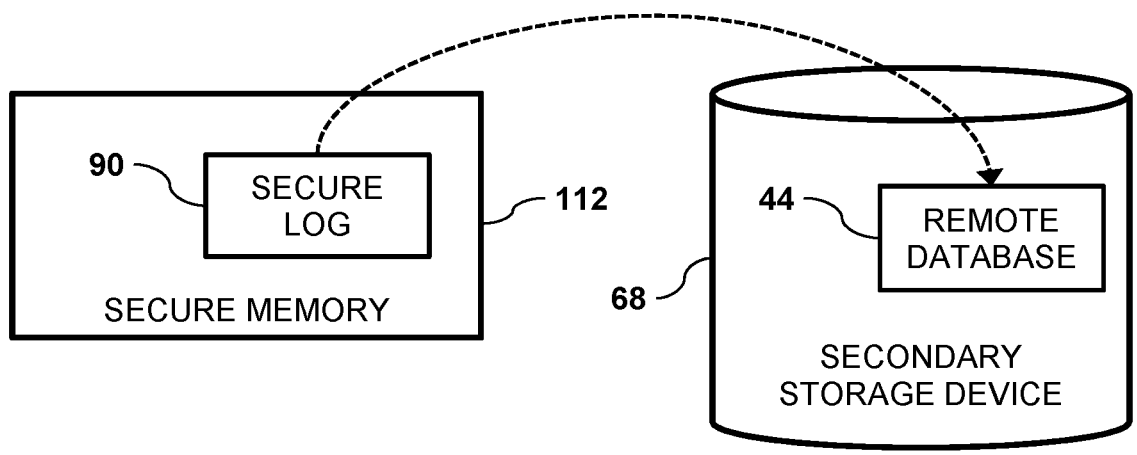
FIG. 8 is a block diagram that shows updating a remote database with transactions stored in a secure log in the disaster-proof storage device.

FIG. 8 is a block diagram that shows updating remote database 44 with transactions stored in secure log 90, in accordance with an embodiment of the present invention. Upon detecting a failure at primary site 22, recovery system 34 can gain access to secure log(s) 90 in disaster-proof storage unit 94, as described hereinbelow in the description referencing FIG. 9.

Following a disaster at primary site 22, power consumption of disaster-proof storage unit 94 should be significantly lower than the disaster-proof storage unit's power consumption during the local database update phase (i.e., the steps described in FIG. 7). To reduce power consumption:

Processor 110 can be "weaker" than processor 96 due to the significantly lower bandwidth of wireless transceiver 126 (i.e., as opposed to the bandwidths of front-end connection 104 and back-end connection 106).

Due to the lower bandwidth of wireless transceiver 126, processor 110 only needs to access a portion of memory 112 at any given time. Therefore, disaster-proof storage unit 94 needs to provide power solely to the required portion of memory 112 when performing the recovery operation described hereinbelow.

Interface 114 (and any other interfaces in) disaster-proof storage unit 94 can be powered off during the recovery operation.

Bus 116 can be segmented into multiple segments. Processor 110 can identify which bus segment(s) need to be active during each step of the recovery operation, and activate only the required segment(s) during each step of the recovery operation.

Figure 9:
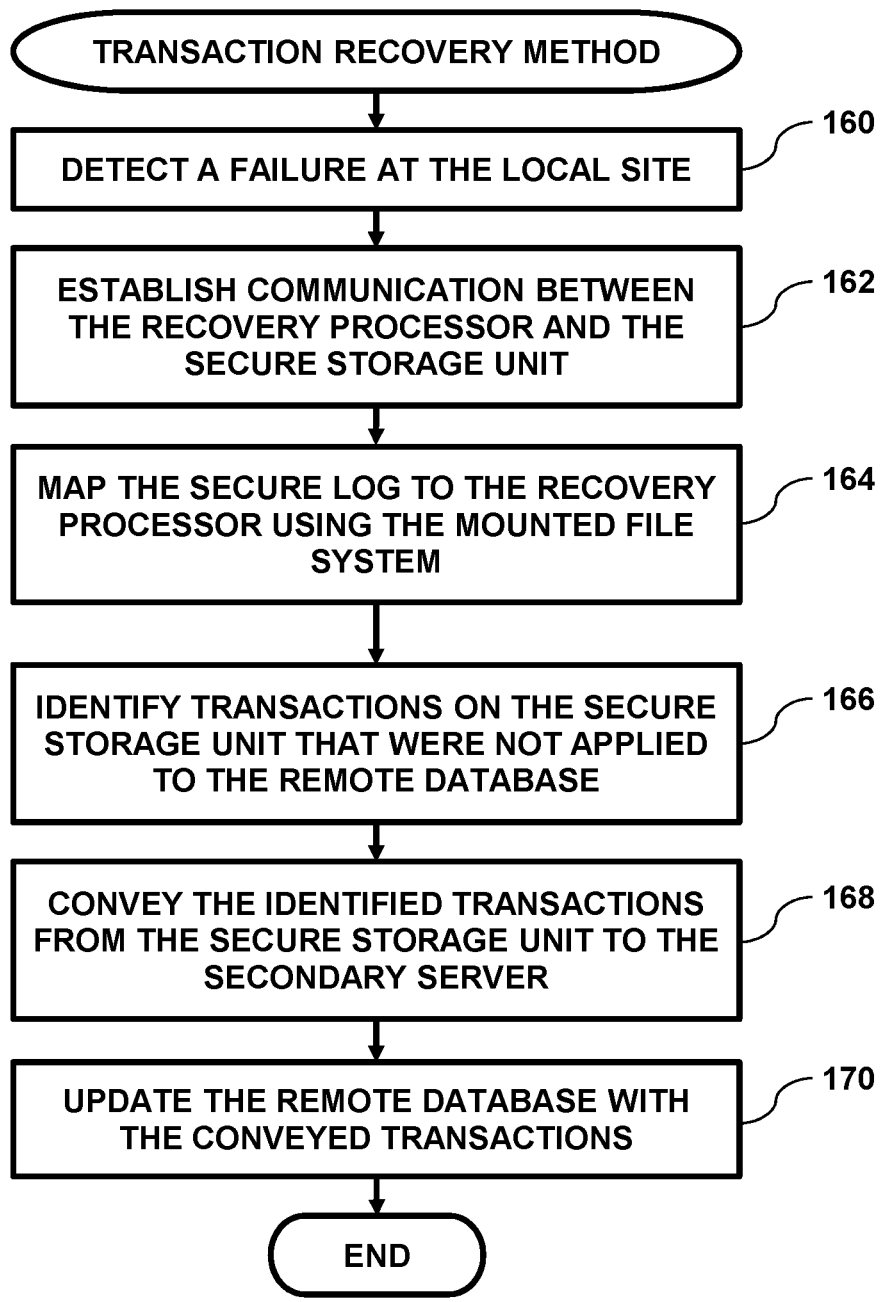
FIG. 9 is a flow diagram that schematically illustrates a method of updating the remote database with transactions stored in the secure log upon detecting a failure in the primary site, in accordance with an embodiment of the present invention.

FIG. 9 is a flow diagram that schematically illustrates a method updating remote database 44 with transactions stored in secure log 90 upon detecting a disaster at primary site 22 or upon receiving an explicit failover command, in accordance with an embodiment of the present invention. In steps of the flow diagram shown in FIG. 9, embodiments of the present invention recover one or more files (e.g., secure log 90) using the second and the third software components of software stack 140.

In a detection step 160, processor 110 detects a disaster at primary site 22. In embodiments described herein, processor 110 may detect the disaster by receiving an explicit failover command, by detecting a loss of external communication (e.g., via data interface 117), or by detecting a loss of power (e.g., via om power interface 115). The disaster can be a failure of one or more devices in primary storage system 28 or a disaster such as a power failure at the primary site. In an initialization step 162, processor 110 establishes communication with recovery system 34.

In a mapping step 164, secure log 90 is mapped to recovery system 34, thereby enabling the recovery system to access secure log file 90. Secure log 90 can be mapped to recovery system using one of the following embodiments:

In a first embodiment, block manager 84 (executing on the recovery system) maps recovery system 34 to raw devices (e.g., the secure memory), and file system manager 82 (also executing on the recovery system) maps secure log file 90 to a logical volume created by the block manager mapping. Upon mapping secure log file 90, processor 78 can access secure log 90 via block-level I/O protocols such as iSCSI over cellular. In this embodiment disaster-proof storage system 94 can function as a protected raw device (e.g., JBOD—"just a bunch of disks").

In a second embodiment, block manager 118 (executing on the disaster-proof storage system) maps the raw devices (e.g., the secure memory) to one or more logical volumes, thereby exposing the logical volumes to recovery system 34, and file system manager 82 executing on processor 78 (in the recovery system) maps secure log(s) 90 to the one or more logical volumes. Upon exposing the logical volumes, processor 78 can access secure log 90 via block-level I/O protocols such iSCSI over cellular. In this embodiment disaster-proof storage system 94 can function as a storage system exposing the logical volume(s).

In a third embodiment, disaster-proof storage unit 94 is configured as an FTP system (i.e., an FTP server or an FTP client), processor 110 can execute recovery processor application logic to identify a given log file 90, retrieve (all or part of) the given log file, and transmit the retrieved log file to the recovery system over FTP protocol.

In a fourth embodiment, NAS manager 121 (executing on the disaster-proof storage system) and a NAS client 86 (executing on the recovery system) can map secure log file(s) 90 to the recovery system 34. Upon mapping secure log file(s) 90, disaster-proof storage system 94 is configured as a NAS device, and processor 78 can directly access secure log(s) 90 using NAS protocols such as NFS and CIFS.

In embodiments where disaster-proof storage unit 94 is configured as a SAN device, recovery system 34 can execute application server logic when accessing the mapped secure log. Examples of application server logic include, but are not limited to, locating the secure log(s) within the file system, identifying a given secure log 90 to be retrieved, and retrieving the identified secure log. In embodiments where disaster-proof storage unit 94 is configured as an FTP system, secure processor 110 can perform data operations such as encryption and compression over the transport protocol.

In an identification step 166, recovery system 34 identifies one or more transactions in secure log(s) 90 or database 42 that were not applied to remote database 42, and in a convey step 168, the recovery system retrieves the identified transactions and conveys them to secondary storage system 38. To identify the one or more transactions in secure log 90 that were not applied to remote database 42, recovery system 34 can identify any transactions in local log 58 that were not mirrored to remote log 59, and store the identified transactions to transaction file 149, as is known in the art.

Finally, in a synchronization step 170, database server 36 updates remote database 44 with the identified transactions in transaction file 149, and the method ends. Upon completing the synchronization step, any client computers (not shown) that were configured to access local database 42 via database server 26 can be reconfigured to access remote database 44 via database server 36.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   partitioning a software stack for processing storage commands, into first, second and third software components managed respectively by a database server at a primary site, by a secure storage unit at or adjacent to the primary site, the secure storage unit comprising a protection storage unit and a disaster-proof storage unit, and by a recovery system at a secondary site;
   receiving, by the database server, a new database transaction comprising an update for a local database stored at the primary site;
   storing the received database transaction to a secure log file in the disaster-proof unit using the first and the second software components, wherein using the first and the second software components comprises mapping the protection storage unit to the database server and mapping the disaster-proof storage unit comprising the secure log file to the protection storage unit; and
   following a disaster occurring at the primary site, recovering, from the disaster-proof storage unit by the recovery system using the second and the third software components, the database transactions in the secure log files so as to synchronize a remote database to a most recent state of the local database prior to the failure, wherein using the second and the third software components comprises mapping the disaster-proof storage unit comprising the secure log file to the recovery system.

2. The method according to claim 1, wherein the software stack is selected from a first module configured to process block-level storage commands, and a second module configured to process file-level storage commands.

3. The method according to claim 1, wherein partitioning the software stack comprises the protection storage unit granting access to the secure log file.

4. The method according to claim 1, wherein partitioning the software stack comprises the disaster-proof storage unit granting access to the secure log file.

5. The method according to claim 1, wherein recovering the database transactions stored in the disaster-proof storage unit using the secure storage unit and the recovery system comprises accessing, by the recovery system, the secure log file on the disaster-proof storage system, identifying, in the secure log file, one or more database transactions not stored to the remote database, and updating the remote database with the one or more identified database transactions.

6. The method according to claim 1, wherein the secure log file is stored in a raw volume on the disaster-proof storage unit.

7. The method according to claim 6, wherein accessing the secure log file comprises mapping, by a block manager executing on the recovery system, the recovery system to the raw volume, and mapping, by a file system manager executing on the recovery system, the secure log file to a logical volume created by the block manager mapping.

8. The method according to claim 6, wherein accessing the secure log file comprises mapping, by a block manager executing on the disaster-proof storage system, the raw volume to one or more logical volumes storing the secure log file, thereby exposing the logical volume to the recovery system, and mapping, by a file manager executing on the recovery system, the secure log file to the one or more logical volumes.

9. The method according to claim 1, wherein accessing the secure log file comprises configuring the disaster-proof storage unit as a File Transfer Protocol (FTP) system selected from a list consisting of an FTP server and an FTP client, identifying, by the disaster-proof storage unit, the secure log file, retrieving the secure log file, and transmitting the retrieved secure log file to the recovery system over an FTP protocol.

10. The method according to claim 1, wherein accessing the secure log file comprises mapping, by an NAS manager executing on the disaster-proof storage system and a NAS client executing on the recovery system, the secure log file to the recovery system.

11. A method, comprising:
    partitioning a software stack into first, second and third software components managed respectively by a primary host at a primary site, by a secure storage unit at or adjacent to the primary site, the secure storage unit comprising a protection storage unit and a disaster-proof storage unit, and by a recovery system at a secondary site;
    storing one or more files in the disaster-proof unit using the first and the second software components;
    partitioning data managed by the software stack into first, second and third data components stored respectively on a primary storage system at the primary site, the disaster-proof storage unit, and a secondary storage system at the secondary site, the second data component comprising the one or more files,
    wherein the primary host comprises a database server, wherein the first data component comprises a local database and one or more local logs, and wherein the second data component comprises one or more secure logs, and wherein the third data component comprises a remote database and one or more remote logs;

allocating a preselected amount of storage space in the disaster-proof storage unit for the one or more secure logs, and upon receiving a database transaction and detecting that the preselected amount of storage space is fully utilized, identifying a least recent database transaction in the one or more secure logs, deleting the identified database transaction from the one or more secure logs, and storing the received database transaction to the one or more secure logs; and following a disaster occurring at the primary site, recovering the files using the secure storage unit and the recovery system.

12. The method according to claim 11, and comprising copying the local database to the remote database.

13. The method according to claim 12, wherein copying the local database to the remote database is selected from a list consisting of mirroring the local database, and creating the remote database from a backup of the local database.

14. The method according to claim 11, wherein the software stack is selected from a first module configured to process block-level storage commands, and a second module configured to process file-level storage commands.

15. The method according to claim 11, and comprising copying the local database to the remote database.

16. The method according to claim 15, wherein copying the local database to the remote database is selected from a list consisting of mirroring the local database, and creating the remote database from a backup of the local database.

17. The method according to claim 11, wherein recovering the files stored in the disaster-proof storage unit using the secure storage unit and the recovery system comprises accessing, by the recovery system, the one or more secure logs on the disaster-proof storage system, identifying, in the one or more secure logs, one or more database transactions not stored to the remote database, and updating the remote database with the one or more identified database transactions.

18. A storage facility, comprising:
a primary storage system located at a primary site and configured to store a local database;
a database server located at a primary site and configured to manage a first software component of a software stack;
a secure storage unit at or adjacent to the primary site, the secure storage unit comprising a protection storage unit and a disaster-proof storage unit, and configured to manage a second software component of the software stack, and to store one or more files in the disaster-proof unit, wherein the database server is configured to receive a new database transaction comprising an update for the local database, and to store, using the first and the second software components, the received database transaction to a secure log file in the disaster-proof unit, wherein using the first and the second software components comprises mapping the protection storage unit to the database server and mapping the disaster-proof storage unit comprising the secure log file to the protection storage unit; and
a recovery system at a secondary site and configured to manage a third software component of the software stack, and following a disaster occurring at the primary site, to recover from the disaster-proof storage using the second and the third software components, the database transactions in the secure log file so as to synchronize a remote database to a most recent state of the local database prior to the failure, wherein using the second and the third software components comprises mapping the disaster-proof storage unit comprising the secure log file to the recovery system.

19. The storage facility according to claim 18, wherein the software stack is selected from a first module configured to process block-level storage commands, and a second module configured to process file-level storage commands.

20. The storage facility according to claim 16, wherein the protection storage unit is configured to grant access to the secure log file.

21. The storage facility according to claim 18, wherein the disaster-proof storage unit is configured to grant access to the secure log file.

22. The storage facility according to claim 16, wherein the recovery system is configured to recover the database transactions stored in the disaster-proof storage unit using the secure storage unit and the recovery system by accessing the secure log file in the secure memory, identifying, in the secure log file, one or more database transactions not stored to the remote database, and updating the remote database with the one or more identified database transactions.

23. The storage facility according to claim 18, wherein the secure log file is stored in a raw volume in the secure memory.

24. The storage facility according to claim 23, wherein the recovery system is configured to access the secure log file by mapping the recovery system to the raw volume, and mapping the secure log file to one or more logical volumes created by the mapping to the raw device.

25. The d storage facility according to claim 23, wherein the recovery system is configured to access the secure log file by mapping, by the secure processor, the raw volume to one or more logical volumes storing the secure log file, thereby exposing the logical volume to the recovery system, and mapping, by the recovery system, the secure log file to the one or more logical volumes.

26. The storage facility according to claim 18, wherein the recovery system is configured to access the secure log file by configuring the disaster-proof storage unit as a File Transfer Protocol (FTP) system selected from a list consisting of an FTP server and an FTP client, identifying, by the secure processor, the secure log file, retrieving the secure log file, and transmitting the retrieved secure log file to the recovery system over an FTP protocol.

27. The storage facility according to claim 18, wherein the secure processor is configured to execute a network-attached storage (NAS) manager, and wherein the recovery system is configured to execute an NAS client, and wherein the recovery system is configured to access the secure log file by mapping, by the NAS manager and the NAS client, the secure log file to the recovery system.

28. A storage facility, comprising:
a primary host located at a primary site and configured to manage a first software component of a software stack;
a primary storage system at the primary site configured to store a first data component of data managed by the software stack;
a secure storage unit at or adjacent to the primary site, the secure storage unit comprising a protection storage unit and a disaster-proof storage unit, and configured to manage a second software component of the software stack, and to store one or more files in the disaster-proof unit, the disaster-proof storage unit configured to store a second data component of the data managed by the software stack, the second data component comprising the one or more files;
a recovery system at a secondary site and configured to manage a third software component of the software stack, and following a disaster occurring at the primary site, to recover the files stored in the disaster-proof storage unit; and a secondary storage unit at the secondary site configured to store a third data component of the data managed by the software stack;

wherein the primary host comprises a database server system, and wherein the first data component comprises a local database and one or more local logs, and wherein the second data component comprises one or more secure logs, and wherein the third data component comprises a remote database and one or more remote logs; and wherein the disaster-proof storage unit comprises a secure processor and a secure memory, and wherein the secure processor is configured to allocate a preselected amount of storage space in the secure memory storage unit for the one or more secure logs, and upon receiving a database transaction and detecting that the preselected amount of storage space is fully utilized, to identify a least recent database transaction in the one or more secure logs, to delete the identified database transaction from the one or more secure logs, and to store the received database transaction to the one or more secure logs.

29. The storage facility according to claim 28, wherein the primary storage system is configured to copy the local database to the remote database.

30. The storage facility according to claim 29, wherein copying the local database to the remote database is selected from a list consisting of mirroring the local database, and creating the remote database from a backup of the local database.

31. A computer software product, the product comprising a non-transitory computer-readable medium, in which program instructions are stored, which instructions, when read by a computer, cause the computer:

to partition, in a storage facility, a software stack for processing storage commands, into first, second and third software components managed respectively by a database server at a primary site, by a secure storage unit at or adjacent to the primary site, the secure storage unit comprising a protection storage unit and a disaster-proof storage unit, and by a recovery system at a secondary site;

to receive, by the database server, a new database transaction comprising an update for a local database stored at the primary site;

to store the received database transaction to a secure log file in the disaster-proof unit using the first and the second software components, wherein using the first and the second software components comprises mapping the protection storage unit to the database server and mapping the disaster-proof storage unit comprising the secure log file to the protection storage unit; and following a disaster occurring at the primary site, to recover, from the disaster-proof storage unit by the recovery system using the second and the third software components, the database transactions in the secure log file so as to synchronize a remote database to a most recent state of the local database prior to the failure, wherein using the second and the third software components comprises mapping the disaster-proof storage unit comprising the secure log file to the recovery system.

* * * * *